D. E. HENNESSY AND J. McGEORGE.
ELECTRICALLY OPERATED ELEVATING PLATFORM TRUCK.
APPLICATION FILED MAR. 23, 1917.
1,331,198.
Patented Feb. 17, 1920.
4 SHEETS—SHEET 1.
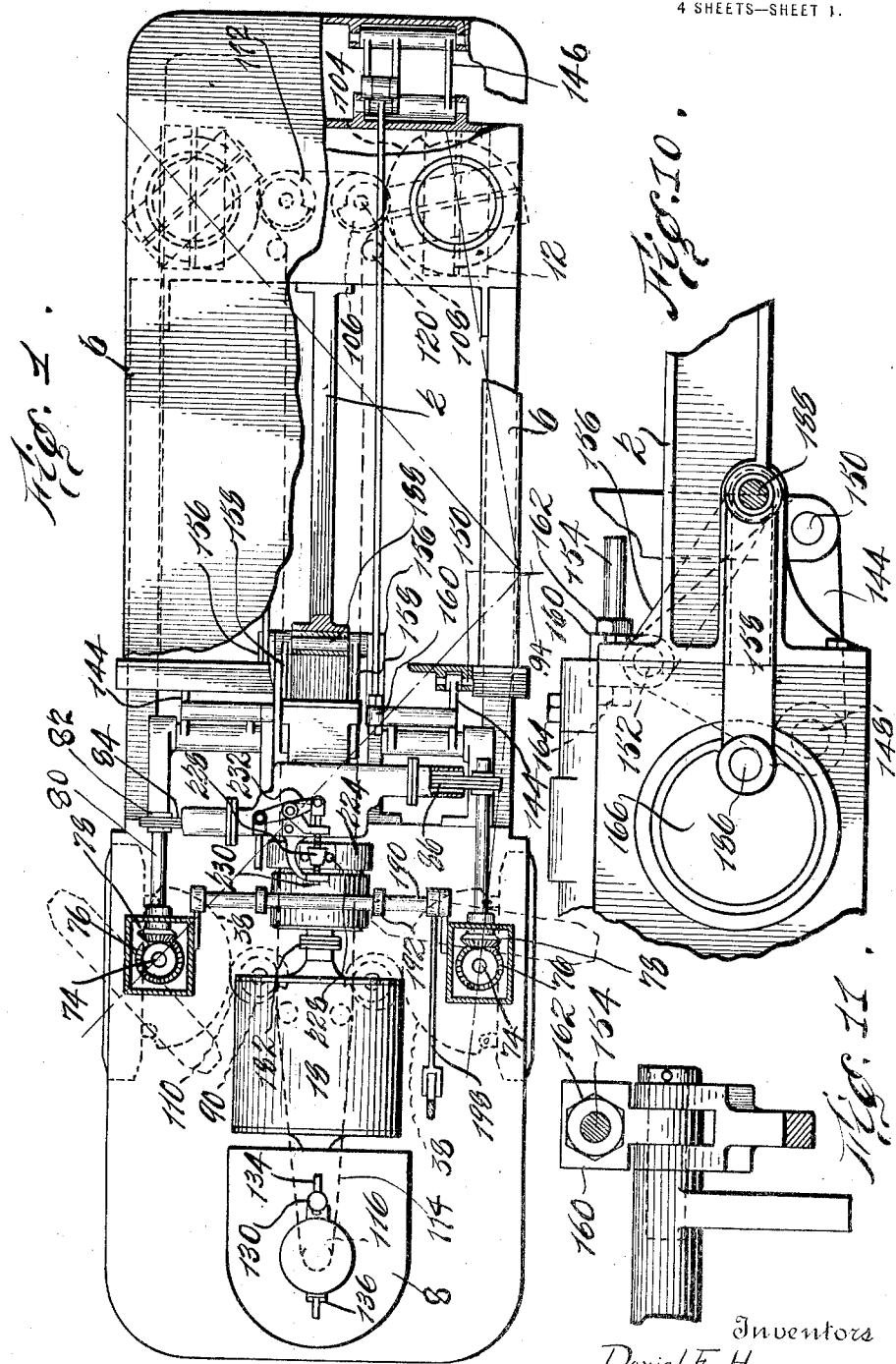
Inventors
Daniel E. Hennessy
John McGeorge
By Their Attorneys Newell & Neal

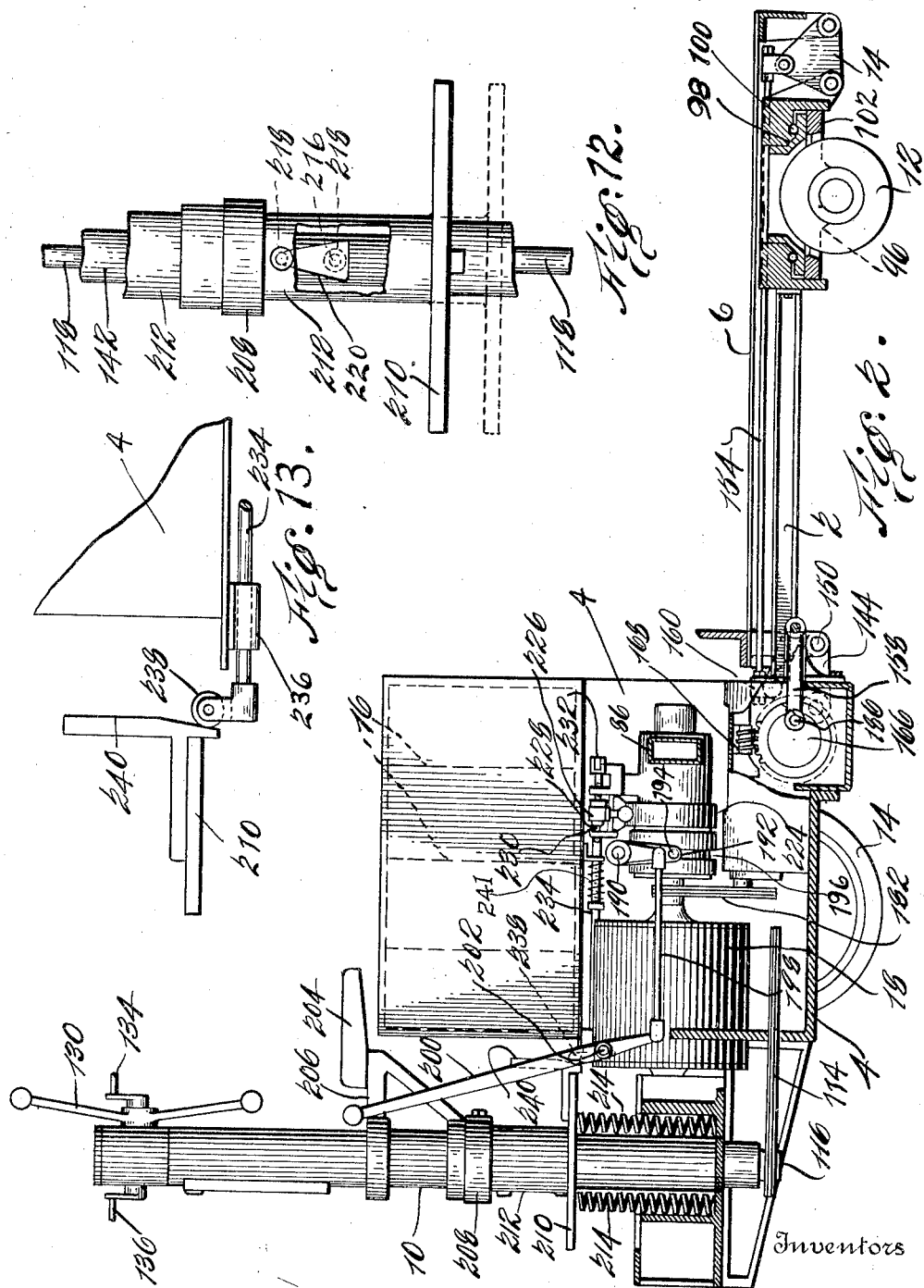

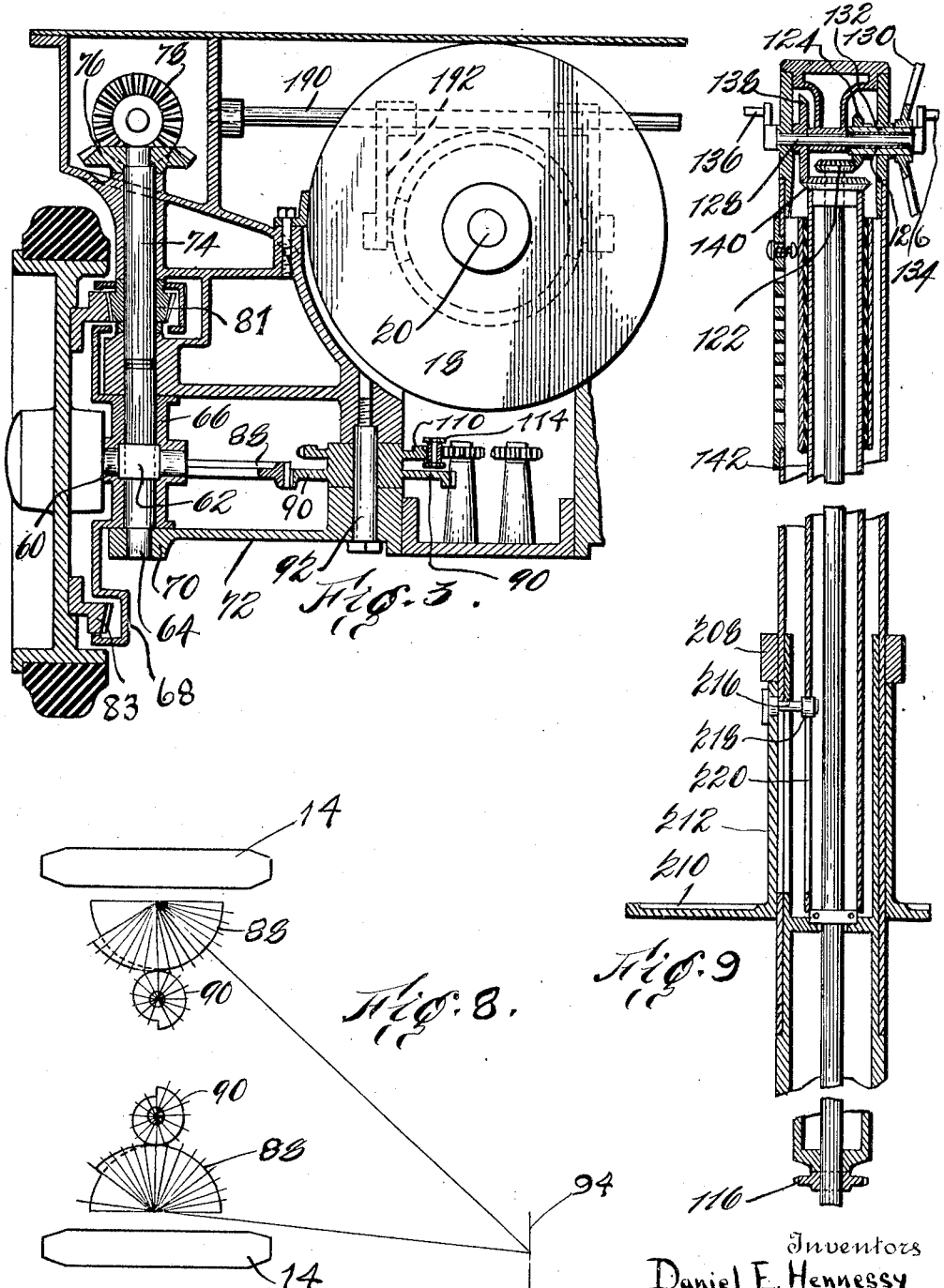

D. E. HENNESSY AND J. McGEORGE.
ELECTRICALLY OPERATED ELEVATING PLATFORM TRUCK.
APPLICATION FILED MAR. 23, 1917.
1,331,198.
Patented Feb. 17, 1920.
4 SHEETS—SHEET 4.
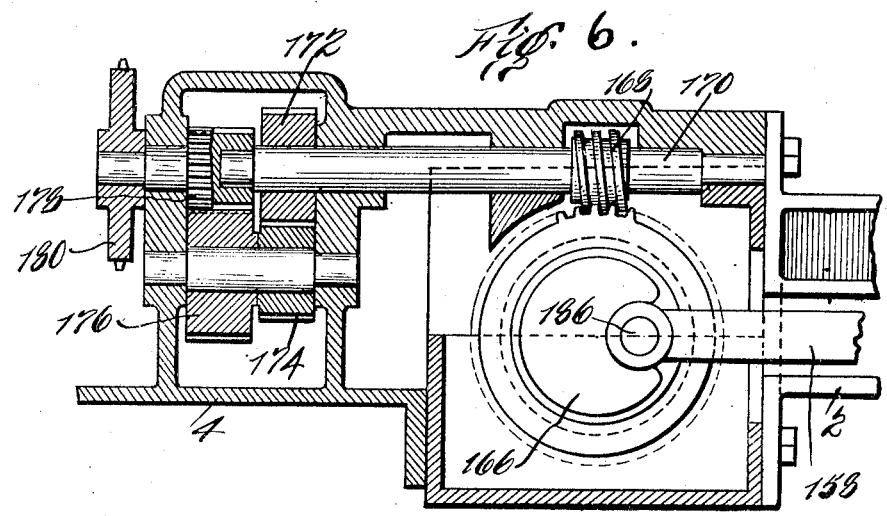
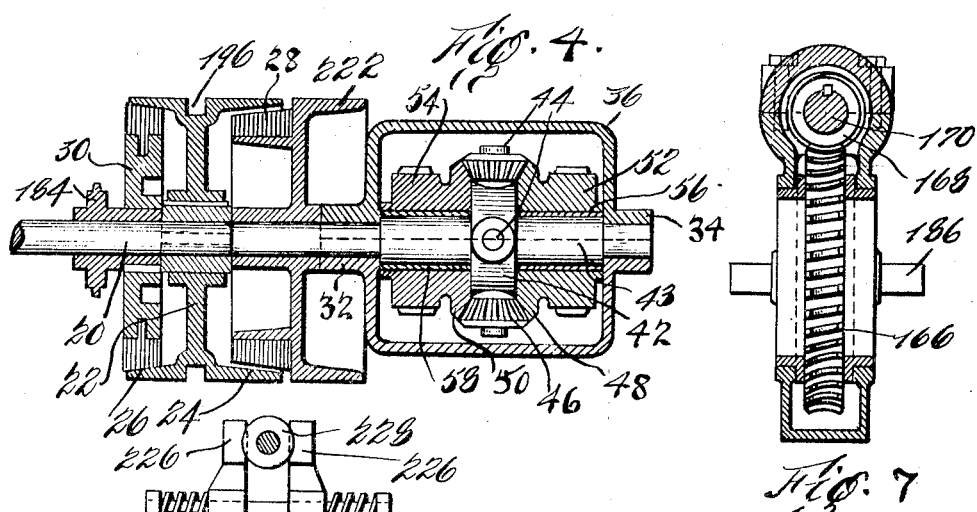
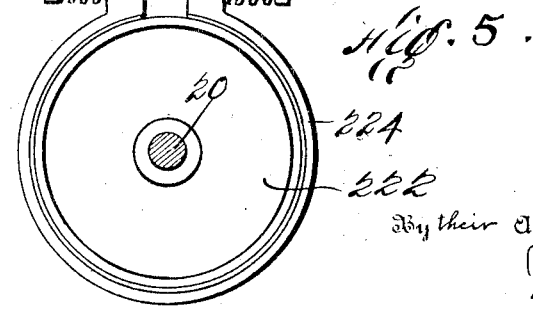
Inventors
Daniel E. Hennessy
John McGeorge
By their Attorneys
Newell & Neal

UNITED STATES PATENT OFFICE.

DANIEL E. HENNESSY AND JOHN McGEORGE, OF HOLYOKE, MASSACHUSETTS, ASSIGNORS TO HERBERT W. COWAN, J. LEWIS WYCKOFF, AND EDWARD N. WHITE, ALL OF HOLYOKE, MASSACHUSETTS, TRUSTEES, DOING BUSINESS AS COWAN TRUCK COMPANY.

ELECTRICALLY-OPERATED ELEVATING PLATFORM-TRUCK.

1,331,198.      Specification of Letters Patent.      Patented Feb. 17, 1920.

Application filed March 23, 1917. Serial No. 157,017.

*To all whom it may concern:*

Be it known that we, DANIEL E. HENNESSY and JOHN McGEORGE, citizens of the United States, residing at Holyoke, county of Hampden, and State of Massachusetts, have invented certain new and useful Improvements in Electrically-Operated Elevating Platform-Trucks, of which the following is a clear, full, and exact description.

This invention relates to self-propelled vehicles, and particularly to self-propelled vehicles of the type used in warehouses and railroad stations for carrying goods and baggage from place to place. The invention is herein shown as embodied in an electrically propelled elevating truck, but it will be understood that many features of the invention are of general applicability in the art to which it relates, and that the invention is not restricted to the embodiment or uses herein illustrated and described.

A general object of the invention is to provide a self-propelled truck which will operate in comparatively restricted spaces and which can be easily and positively steered and controlled under all conditions.

A particular object of the invention is so to improve the steering mechanism of self-propelled vehicles that not only may the ideal steering conditions be obtained so far as location of the steering wheels on tangents of concentric circles is concerned, but the range of the steering movement may also be increased whereby the vehicle may be completely turned in the smallest possible space. In the preferred embodiment of the invention, the improvements relating to the steering of the vehicle are applied to all four wheels of the vehicle and all four wheels are arranged to travel on tangents to concentric circles having their common center between the ends of the truck. It will be understood, however, that many of the advantages of the improved steering construction can be obtained in a vehicle having only two of the wheels arranged for steering.

Another object of the invention is to simplify the control of the vehicle both with respect to the steering and with respect to the self-propelling mechanism. The invention aims also to prevent injury either to the vehicle or to the operator, and to this end the operations of the various mechanisms have been so correlated to each other and to the means by which the operator controls their operation that the vehicle can be operated only when the operator is in a position properly to control the vehicle.

Another object of the invention is to provide a power-driven truck in which the load carrying frame or platform may be automatically elevated whereby the truck can conveniently be used with removable load receiving platforms. Other objects and important features of the invention will appear from the following description and claims, when considered in connection with the accompanying drawings, in which—

Figure 1 is a plan view of a truck embodying the invention, with parts broken away to show parts otherwise concealed and with parts also shown in section;

Fig. 2 is a longitudinal vertical section through the truck shown in Fig. 1, a portion of the truck platform being shown in side elevation; and Fig. 3 is a sectional detail, showing the steering and driving connections to one of the combined steering and driving wheels of the truck;

Fig. 4 is a longitudinal vertical section through the clutch and differential mechanism of the truck;

Fig. 5 is a detail view illustrating the transmission brake;

Fig. 6 is a longitudinal vertical section through the power-operated means for elevating the truck platform;

Fig. 7 is a vertical section through the worm and screw drive of the elevating mechanism illustrating the manner of mounting the worm wheel;

Fig. 8 is a diagrammatic view illustrating the layout of the steering gears;

Fig. 9 is a vertical section through the steering and controlling post;

Fig. 10 is a detail view illustrating the connection of the power-operated means to the elevating platform;

Fig. 11 is a detail view of a part of the means shown in Fig. 10;

Fig. 12 is a broken front elevation of part of the steering and controlling post; and Fig. 13 is a detail of the brake controlling mechanism.

The illustrated truck comprises a low horizontal frame 2 connected at its forward end to the frame or casing 4, in which is located the electrically operated propelling mechanism of the vehicle and the mechanism by which the elevating platform 6 is raised. At the front of the frame or casing 4 is a platform 8, which carries the steering and controlling post 10, the parts thus far described being supported upon four wheels comprising combined supporting and steering wheels 12 beneath the platform 6 and combined steering and driving wheels 14 beneath the elevated portion of the truck frame.

The power for driving the truck and for operating the elevating mechanism is received from storage batteries 16 mounted upon the frame 4, and is applied through an electric motor 18 having a horizontal driving shaft 20, to which is attached a clutch-wheel 22 having two conical clutch surfaces 24 and 26, the clutch surface 24 coöperating with the other member 28 of a cone clutch, through which the driving mechanism of the vehicle is operated, and the clutch surface 26 coöperating with the other member 30 of a cone clutch, through which the elevating mechanism of the truck is operated.

Mounted in anti-friction bearings 32 and 34 in a casing 36 provided for protection and lubrication thereof is a differential gearing through which the power of the motor 18 is transmitted to the driving wheels 14 of the truck, this differential gearing comprising a pinion-carrying disk 42 attached to a shaft 43, connected to the clutch member 28, said disk being provided with radial bearing studs 44 for bevel pinions 46, which mesh with bevel gears 48 and 50, integral with sprocket wheels 52 and 54 having their bearings upon sleeves 56 and 58 upon the shaft 43.

The driving wheels 14 are mounted on stub axles or spindles 60 having squared body portions 62 confined upon vertical spindle shafts 64, the body 62 and shaft 64 being confined in extensions 66 of the gear housings 68, the ends of the shafts 64 being confined in bearings in the forked ends 70 of the axle 72 and the extensions 66 of the housings 68 fitting within these forked ends.

The frame or casing 4 into which the upper part of each wheel 14 extends is so recessed upon each side of the axle 72 that the wheel may turn with its spindle 60 about the bearing of the spindle shaft 64 through an angle of nearly 90° to either side of the axle, the limit of the turning movement being shown in dotted lines in Fig. 1 of the drawings.

Mounted in bearings above the spindle shaft 64 and coaxial with said shaft is a pinion shaft 74 having at its upper end a bevel pinion 76 meshing with a bevel pinion 78 on a horizontal shaft 80 extending lengthwise of the vehicle. The shaft 80 carries a sprocket wheel 82, which is driven from the sprocket wheel 54 by means of a sprocket chain 84, there being a corresponding driving mechanism upon the other side of the vehicle, connected by a sprocket chain 86 to the sprocket wheel 52. A pinion 81 on the shaft 74 meshes with the gear ring 83 on the driving wheel 14.

In order to keep the steering wheels tangential to concentric circles, thus producing the ideal steering condition for a driven vehicle, the steering mechanism now to be described is provided, this mechanism constituting one of the most important features of the present invention. Connected to the gear housing 68 of each of the driving and steering wheels 14 is a gear segment 88 which is not wholly concentric with the axis of the spindle shaft 64 and which does not have its gear teeth arranged upon the arc of a single circle. This gear segment meshes with a somewhat spiral-shaped gear 90 upon a vertical stud shaft or bolt 92 in the axle 72, the curvature of this gear being such that it meshes with the gear segment 88 throughout the range of steering movement of the steering and driving wheel 14. The curves of the segments 88 and gears 90 are so plotted that when the gears 90 are turned in opposite rotational directions and through equal angles about their axes, the steering wheels will be moved by the gear segments 88 into tangential relation to concentric circles, these circles in the illustrated construction having their common center upon a line of centers 94, located substantially midway between the front and rear wheels of the truck.

The rear wheels 12 of the truck are preferably also arranged to be steered, and to this end each of these wheels is mounted in a wheel support 96 having a swivel connection with the horizontal frame 2, the illustrated swivel comprising a bearing cone 98 resting against ball bearings 100 in a ball race in the frame 2, said bearing cone being confined in the frame by means of a ring 102. Each of the steering wheel supports 96 has connected therewith a gear segment 104 having the shape of the gear segment 88, and coöperating with each segment 104 is a gear 106 of substantially the shape of the gear 90, the gears 106 being mounted upon vertical stud shafts 108.

Mechanism is provided for operating all four of the steering wheels simultaneously and in such manner that all may be placed in tangential relation to concentric circles having their common center on the line of centers 94. It will be noted that there are two of the supporting wheels 12 in each of the wheel supports 96, but in describing the steering mechanism of the truck, each of these wheel couples will be considered as a single wheel, as in such expressions as "all four".

The illustrated mechanism for controlling the steering movements of the front and rear wheels simultaneously comprises a sprocket wheel 110 integral with each of the gears 90 and a sprocket wheel 112 integral with each of the gears 106, these sprocket wheels being connected by a continuous sprocket chain 114 which engages the nearer or inner sides of the gears 90 and the remote sides of the gears 106, and also passes over a sprocket wheel 116 on the lower end of a vertical steering shaft 118 in the steering and controlling post 10. Guide rollers 120 are located in front of the gears 106.

At its upper end the shaft 118 is provided with a bevel gear 122, which meshes with a bevel gear 124 upon a sleeve 126 surrounding the controller shaft 128, this sleeve being connected to the steering wheel 130 having its hub 132 mounted in bearings in the upper part of the steering and controlling post 10. The controller shaft 128 is provided at its respective ends with operating handles 134, 136, whereby the controller may be operated from either side of the post 10, the controller shaft 128 having attached thereto a bevel gear 138 which meshes with a bevel gear 140 on the controller sleeve 142. The electrical mechanism of the controller may be of any suitable or usual construction and in itself does not constitute a part of the present invention.

From the foregoing description and from an inspection of Fig. 1 of the drawings, it will be noted that when the steering handle is turned to effect the steering of the vehicle all four of the steering wheels will be turned into tangential relation to concentric circles and in such manner as to effect the turning of the vehicle in the smallest space, the wheels all traveling in the same direction about the common center. When, as shown in Fig. 1 of the drawings, the wheels are turned to their extreme limit in any steering direction, the common center will lie substantially in one side of the truck.

The elevating mechanism of the truck comprises links 144 and 146 at the front and rear, respectively, of the elevating platform 6, these links being of substantially triangular shape and being each provided with three points of pivotal connection. Each link is connected at the point 148 with the frame 2, at the point 150 with a depending portion of the platform 6, and at the point 152 with one of two rods 154 connecting the front and rear links on each side of the truck.

Each of the triangular links 144 has a link connection 156 with an operating link 158, and a pivotal connection having a sleeve portion 160 confined between nuts 162 and 164 on the rod 154. The link 158 is forked and embraces a worm gear 166 which is driven by a worm 168 upon a shaft 170, connected by a train of reducing gears and pinions 172, 174, 176 and 178, with a sprocket wheel 180, connected by a sprocket chain 182 with a sprocket wheel 184, connected to the clutch member 30. The connection between the link 158 and the worm wheel 166 comprises a pivot pin 186, and a pivot pin 188 extending through this link and into the connecting link 156 of the rod connections on either side of the middle of the frame 2 completes the connection between the worm gear 166 and the two sides of the platform elevating means.

From the foregoing description it will be seen that when the clutch member 22 is moved toward the right in Fig. 4 of the drawings, it will effect an operating connection between the electric motor 18 and the driving wheels 14. When the clutch member 22 is moved toward the left in this figure, it will effect an operating connection between the motor 18 and the worm gear 166, and thus effect the elevation of the platform 6 through the lifting links 144 and 146 hereinabove described. The means for moving the clutch member 22 in either of its two directions of movement, to effect either a driving connection or an elevating connection, comprises a rock shaft 190 having depending arms 192 provided with studs 194 entering a slot 196 in the periphery of the clutch member 22, the arms 192 embracing said clutch member, and one of these arms being connected by a link 198 with an operating lever at 200 fulcrumed at 202 on the frame, this lever being located in convenient reach of the operator, who ordinarily sits upon a seat 204 carried by a bracket 206 surrounding the post 10 and supported at a suitable height upon said post by a collar 208 clamped upon said post.

To prevent operation of the truck when the operator is not in a position properly to control the truck, safety means are provided, the illustrated means being arranged to be operated from a platform 210, which is provided with a sleeve 212 surrounding the post 10, and which is supported upon springs 214 upon the sides of said post 10, these springs tending to maintain the platform in its uppermost position. When the platform is in this position, the electric controlling mechanism is held in inoperative position and a brake is applied to the transmission mechanism of the vehicle to prevent movement of the vehicle by hand.

The illustrated means for holding the electrical controlling mechanism in inoperative position is also arranged to automatically move the controller back to neutral position, and comprises a stud 216 connected to the sleeve 212 and having upon its inner end a cam roller 218 which works in an inverted V-shaped cam slot 220 in the controller sleeve 142. When the platform is depressed, the controller may be turned in either direction about its axis until it engages the roller 218, but when the operator leaves the platform and the springs again restore it to its uppermost position, the roller will engage the one side or the other of the V-shaped slot 220 and again restore the controller to its neutral position.

The brake mechanism hereinabove referred to comprises a brake drum 222 upon the clutch member 28, surrounded by a brake band 224 normally tending to move into braking relation to the drum 222, said band having at its ends rollers 226 between which is located a wedge 228 carried by a slide 230 in which said wedge is adjustable, said slide being connected to one arm of a lever 232 having its other arm connected to a rod 234 arranged to slide in a guide 236 on the frame 4 and carrying at its front end a cam roller 238 coöperating with a cam 240 attached to the platform 210. When the platform is in its elevating position shown in Fig. 2 of the drawings, the brake band 224 is free to spring into braking relation to the brake drum 222 but when the platform is depressed, the action of the cam 240 on the roller 238 forces the wedge 228 between the ends of the brake band 224 and thus releases the brake. If the spring action of the brake band 224 is not sufficient to force the wedge 228 rearwardly, suitable resilient means 241 may be provided for effecting the required movement of the rod 234 or of the lever 232.

What we claim as new is:—

1. In a vehicle of the class described, the combination with driving wheels, a frame mounted on said vehicle for an up and down movement thereon, and elevating mechanism for raising said frame, of power mechanism, and transmission mechanism comprising two driven members and a single driving member relatively movable into operative driving relation to either of said driven members for effecting a connection of said power mechanism either to said driving wheels or to said elevating mechanism for raising said frame.

2. In a power operated elevating truck, the combination with driving wheels, a frame mounted on said vehicle for an up and down movement thereon, and elevating mechanism for raising said frame, of power mechanism comprising a clutch member, and means for moving said clutch member into positions to effect either an operative driving connection to said driving wheels or an operative connection to said elevating mechanism.

3. In a truck of the class described, the combination with driving wheels, power mechanism for driving said truck and transmission connections between said power mechanism and said driving wheels, of means for controlling the operation of the power mechanism, a transmission brake, an upright post having a platform for the operator vertically slidable thereon and means controlled by the position of said platforms for applying the brake and preventing the operation of the power mechanism when the operator is not in position to control the truck.

4. In a truck of the class described, the combination with driving wheels and electrically operated means for operating said driving wheels, of a controller for said electrical means, a post in which said controller is located, an operator's platform vertically slidable upon said post, and connections between said controller and said platform whereby said controller is moved to neutral position when the operator leaves the platform.

5. In an electrically operated elevating truck, the combination with elevating mechanism and electrically driven means for operating said elevating mechanism, of means for controlling the operation of said elevating mechanism, and safety means associated with said controlling means and acting automatically when the operator leaves the truck to restore said controlling means to position for stopping further operation of said elevating mechanism.

6. In a truck of the class described, the combination of driving wheels, of electrically operated means for operating said driving wheels, of a controller for said electrical means, an upright post in which said controller is located, an operator's platform vertically slidable on said post, means normally tending to move said platform upwardly, and connections between said controller and such platform comprising a V-shaped cam and member coacting therewith, whereby said controller may be turned in either direction when said platform is depressed but is moved to neutral position by the upward movement of the platform whenever the operator ceases to hold the platform down.

Signed at Holyoke, Massachusetts, this 12th day of February, 1917.

DANIEL E. HENNESSY.
JOHN McGEORGE.

Witnesses for Hennessy:
C. T. NEAL,
H. M. TAYLOR.

Witnesses for McGeorge:
RAYMOND F. LYNN,
GEORGE F. JENKS.